United States Patent
Hoefel et al.

(10) Patent No.: US 10,007,260 B2
(45) Date of Patent: Jun. 26, 2018

(54) FAULT DETECTION AND TOLERANCE IN DOWNHOLE TOOL STRING ASSEMBLIES

(71) Applicant: Schlumberger Technology Corporation, Sugar Land, TX (US)

(72) Inventors: Albert Hoefel, Sugar Land, TX (US); Kent David Harms, Richmond, TX (US); Steven G. Villareal, Cheltenham (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 353 days.

(21) Appl. No.: 14/755,323

(22) Filed: Jun. 30, 2015

(65) Prior Publication Data
US 2017/0002640 A1    Jan. 5, 2017

(51) Int. Cl.
*G05B 23/02* (2006.01)
*E21B 44/00* (2006.01)

(52) U.S. Cl.
CPC ........ *G05B 23/0218* (2013.01); *E21B 44/005* (2013.01)

(58) Field of Classification Search
CPC .......................... G05B 23/0218; E21B 44/005
See application file for complete search history.

(56) References Cited

U.S. PATENT DOCUMENTS

| | | |
|---|---|---|
| 6,615,916 B1 | 9/2003 | Vachon |
| 8,923,095 B2 | 12/2014 | Pettersen et al. |
| 2009/0140879 A1 | 6/2009 | Kamata et al. |
| 2013/0010572 A1* | 1/2013 | Bonavides ............ E21B 47/12 367/81 |
| 2013/0043048 A1 | 2/2013 | Joseph |

FOREIGN PATENT DOCUMENTS

| | | |
|---|---|---|
| KR | 100549081 B1 | 2/2006 |
| WO | WO2004112212 A1 | 12/2004 |

OTHER PUBLICATIONS

Short Circuit Protection in LTB Tool String, ip.com Disclosure No. IPCOM000183010D, published on IP.com on May 12, 2009, 9 pages.
International Search Report and Written Opinion issued in International Patent application PCT/US2016/038280, dated Sep. 12, 2016. 14 pages.
International Preliminary Report on Patentability issued in International Patent application PCT/US2016/038280, dated Jan. 11, 2018. 11 pages.

* cited by examiner

*Primary Examiner* — Scott Bauer

(57) ABSTRACT

Systems, methods, and devices for fault detection and tolerance in a downhole tool string are provided. If a fault is detected in an electrical path between tools of downhole tool string, one or more switches of a fault detection and tolerance circuit may be kept open to isolate the fault in an electrical path between tools of downhole tool string. If a fault is not detected, one or more switches of a fault detection and tolerance circuit may be closed to enable the transmission of signals on the electrical path. In some embodiments of fault detection and tolerance circuits, an additional one or more switches may be kept open to isolate the fault in electronics of the tool.

8 Claims, 8 Drawing Sheets

US 10,007,260 B2

FAULT DETECTION AND TOLERANCE IN DOWNHOLE TOOL STRING ASSEMBLIES

BACKGROUND

This disclosure relates to downhole tools and, more particularly, to electrical fault tolerance and detection in such tools.

Downhole drilling operations may include the use of drilling tools used for measuring, logging, or sampling while drilling. A drilling tool string may include several modules (e.g., tools) connected together in series and powered by a power source. The electrical stability of the tool string may be affected by various factors, such as short circuits or inrush currents at power up that stress the power source. Repairing a short circuit or replacing a tool or module in the tool string may result in removal of the tool string from downhole and may be expensive and time-consuming.

SUMMARY

A summary of certain embodiments disclosed herein is set forth below. It should be understood that these embodiments and associated aspects are presented merely to provide the reader with a brief summary of these certain embodiments and that the associated aspects are not intended to limit the scope of this disclosure. Indeed, this disclosure may encompass a variety of embodiments and aspects that may not be set forth below.

In some embodiments, a method is provided that includes providing power from a power source to a first tool of a plurality of tools in a tool string disposed in a wellbore and determining whether a fault exists in an electrical path between the first tool and a second tool of the plurality of tools or in an electrical path between the first tool and the power source. The method further includes maintaining a switch in an open position if the fault exists, the switch disposed between the first tool and the power source and switching the switch to a closed position if the fault does not exist.

In some embodiments, a method is provided that includes providing power from a power source to a first tool of a plurality of tools in a tool string disposed in a wellbore and determining whether a fault exists in an electrical path between the first tool and a second tool of the plurality of tools or in an electrical path between the first tool and the power source. The method further includes maintaining at least one of a first switch and a second switch in an open position if the fault exists. The at least one of a first switch and a second switch is disposed between the first tool and the power source. The method also includes switching the first switch and the second switch to a closed position if the fault does not exist.

Additionally, in some embodiments, a method is provided that includes providing a first signal and a second signal from a signal source to a first tool of a plurality of tools in a tool string, the plurality of tools configured to obtain measurements in a wellbore of well. The signal source is located downhole from the first tool and the first signal may include power and the second signal may include a communication to at least one of the tools of the plurality of tools. The method also includes determining whether a fault having a resistance exists in an electrical path between the first tool and a second tool of the plurality of tools and maintaining an uphole switch in an open position and switching a downhole switch to a closed position if the fault exists and the resistance is a first resistance. The method also includes maintaining the uphole switch in an open position and maintaining the downhole switch in an open position if the fault exists and the resistance is a second resistance higher than the first resistance.

BRIEF DESCRIPTION OF THE DRAWINGS

Various embodiments and associated aspects of this disclosure may be better understood upon reading the following detailed description and upon reference to the drawings in which.

DETAILED DESCRIPTION

Described herein are various implementations related to various devices and process for fault detection and tolerance in a downhole tool string. In some embodiments, a tool string may include a telemetry tool or other source that provides signals (e.g., power, communication, etc.) to tools arranged in series in the tool string. In some embodiments, each tool may include or be coupled to a fault detection and tolerance circuit that detects faults (e.g., short circuits) in the tool string or in the tool electronics and isolates the fault such that other tools in series in the tool string may continue to receive signals from and, in some embodiments, transmit signals to the telemetry tool along an electrical path.

In some embodiments, a fault detection and tolerance circuit may include a switch that isolates the tool or a portion of the tool string from the telemetry tool, such that tools after the isolated tool or tool string portion do not receive signals from and, in some embodiments, do not transmit signals to, the telemetry tool. In some embodiments, a fault detection and tolerance circuit may include multiple switches that provide for use of the circuit above or below the telemetry tool and that can isolate faults between two tools of the tool string or inside a tool's electronics.

In some embodiments, a fault detection and tolerance circuit may include switches, a sense resistor, and an alternating current (AC) coupler. In such embodiments, if a low resistance short is detected, both communication and power may be cutoff to tools in series above the detected fault. If a high resistance short is detected, power may be cutoff to tools in series above the detected fault but communications may still be transmitted to tools in series above the detected fault. Further, in such embodiments, if an internal tool short is detected, power may be cutoff to tools in series above the detected fault but communications may still be transmitted to tools in series above the detected fault.

These and other embodiments of the disclosure will be described in more detail through reference to the accompanying drawings in the detailed description of the disclosure that follows. This brief introduction, including section titles and corresponding summaries, is provided for the reader's convenience and is not intended to limit the scope of the claims or the proceeding sections. Furthermore, the techniques described above and below may be implemented in a number of ways and in a number of contexts. Several example implementations and contexts are provided with reference to the following figures, as described below in more detail.

Figure 1:
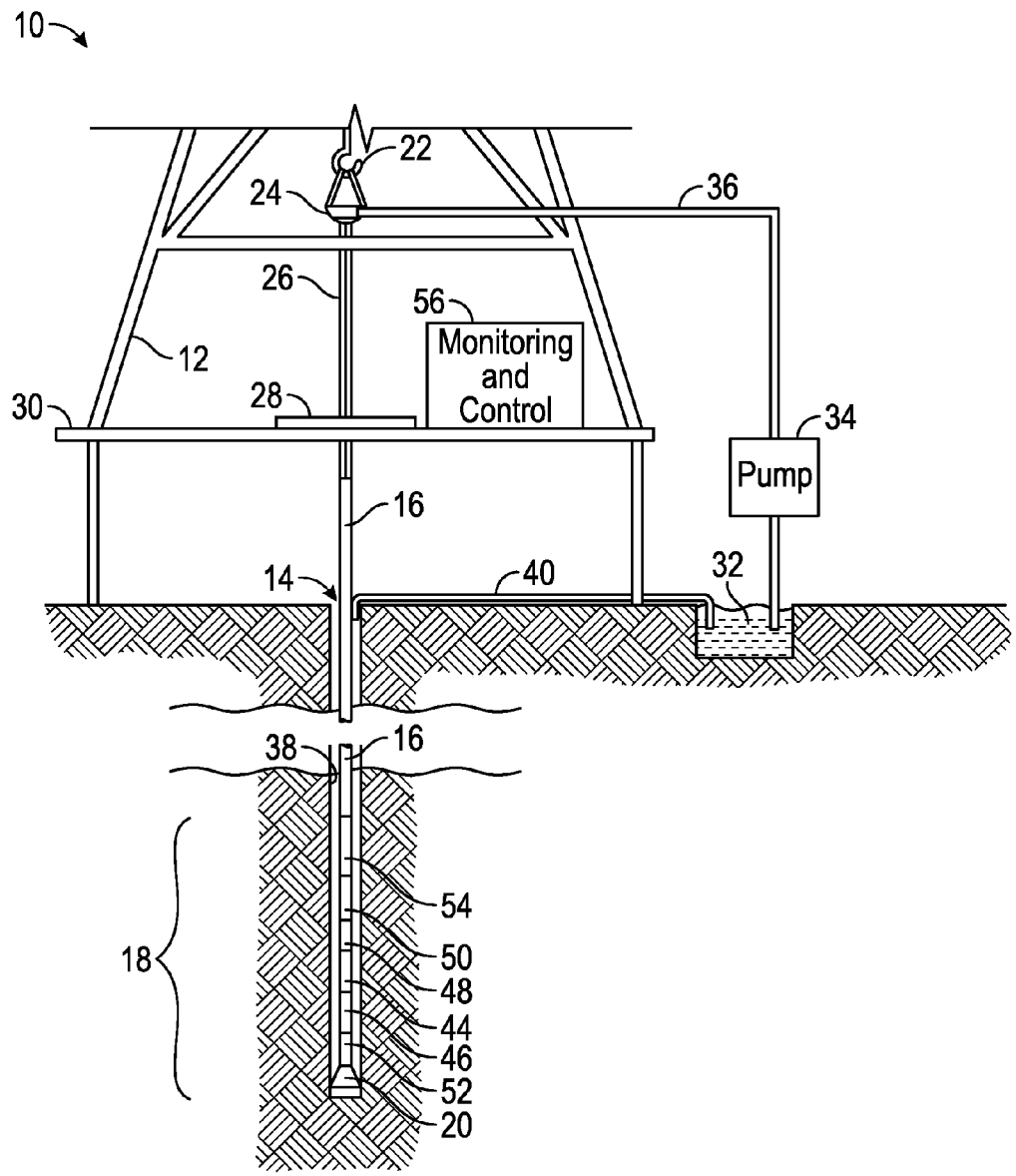
FIG. 1 is a schematic diagram of a drilling system in accordance with an example embodiment of the disclosure.

More specifically, a drilling system 10 is depicted in FIG. 1 in accordance with one embodiment. While certain elements of the drilling system 10 are depicted in this figure and generally discussed below, it will be appreciated that the drilling system 10 may include other components in addition to, or in place of, those presently illustrated and discussed. As depicted, the drilling system 10 can include a drilling rig 12 positioned over a well 14. Although depicted as an onshore drilling system 10, it is noted that the drilling system could instead be an offshore drilling system. The drilling rig 12 can support a drill string 16 that includes a bottomhole assembly 18 having a drill bit 20. The drilling rig 12 can rotate the drill string 16 (and its drill bit 20) to drill the well 14.

The drill string 16 can be suspended within the well 14 from a hook 22 of the drilling rig 12 via a swivel 24 and a kelly 26. Although not depicted in FIG. 1, the skilled artisan will appreciate that the hook 22 can be connected to a hoisting system used to raise and lower the drill string 16 within the well 14. As one example, such a hoisting system could include a crown block and a drawworks that cooperate to raise and lower a traveling block (to which the hook 22 is connected) via a hoisting line. The kelly 26 can be coupled to the drill string 16, and the swivel 24 can allow the kelly 26 and the drill string 16 to rotate with respect to the hook 22. In the presently illustrated embodiment, a rotary table 28 on a drill floor 30 of the drilling rig 12 can be constructed to grip and turn the kelly 26 to drive rotation of the drill string 16 to drill the well 14. In other embodiments, however, a top drive system could instead be used to drive rotation of the drill string 16.

During operation, drill cuttings or other debris may collect near the bottom of the well 14. Drilling fluid 32, also referred to as drilling mud, can be circulated through the well 14 to remove this debris. The drilling fluid 32 may also clean and cool the drill bit 20 and provide positive pressure within the well 14 to inhibit formation fluids from entering the wellbore. In FIG. 1, the drilling fluid 32 can be circulated through the well 14 by a pump 34. The drilling fluid 32 can be pumped from a mud pit (or some other reservoir, such as a mud tank) into the drill string 16 through a supply conduit 36, the swivel 24, and the kelly 26. The drilling fluid 32 can exit near the bottom of the drill string 16 (e.g., at the drill bit 20) and can return to the surface through the annulus 38 between the wellbore and the drill string 16. A return conduit 40 can transmit the returning drilling fluid 32 away from the well 14. In some embodiments, the returning drilling fluid 32 can be cleansed (e.g., via one or more shale shakers, desanders, or desilters) and reused in the well 14. The drilling fluid 32 may include an oil-based mud (OBM) that may include synthetic muds, diesel-based muds, or other suitable muds.

In addition to the drill bit 20, the bottomhole assembly 18 can also include various instruments. For example, as depicted in FIG. 1, the bottomhole assembly 18 can include a tool string having, for example, a logging-while-drilling (LWD) module 44 a measurement-while-drilling (MWD) module 46, and one or more additional modules. The modules can include tools having sensors, housed in drill collars, that can collect data and enable the creation of measurement logs in real-time during a drilling operation. The modules could also include tools having memory devices for storing the measured data. For example, the LWD module 44 can include tools having sensors that measure various characteristics of the rock and formation fluid properties within the well 14. The bottomhole assembly 18 can also include one or more additional modules 48, which could be LWD modules, MWD modules, sampling-while-drilling modules, or some other modules. It is noted that the bottomhole assembly 18 is modular, and that the positions and presence of particular modules of the assembly could be changed as desired. Further, one or more of the modules 44, 46, and 48 can be or can include a fluid sampling tool configured to obtain a sample of a fluid from a subterranean formation and perform downhole fluid analysis to measure various properties of the sampled fluid.

The bottomhole assembly 18 can also include other modules. As depicted in FIG. 1 by way of example, such other modules can include a turbine generator 50, a steering module 52, and a communication module 54. In one embodiment, the turbine generator 50 may be driven by the flow of drilling mud through the drill string 16, out of the drill bit 20, and through the annulus 38 to the return conduit 40. As seen in FIG. 1, the drill string 12 is generally aligned along a longitudinal z-axis. Components of the drill string 12 may be located within the drill string at various radial distances from the z-axis, as illustrated by a radial r-axis. Certain components, such as the turbine generator 50, may include parts that rotate circumferentially along a circumferential c-axis. The turbine generator 50 may convert the hydraulic power of the drilling fluid 32 moving through the drill string 16 into mechanical rotational power in a rotating shaft. The rotating shaft may rotate along the z-axis in the same circumferential direction of the c-axis. In other embodiments, however, the turbine generator 50 may cause the rotating axis to rotate in the opposite direction. The rotating shaft, which may also include or be referred to as a rotor, provides the mechanical power that will be used to generate electrical power. The rotation of the rotating shaft may cause an alternator to generate electrical power for the electrical components.

The steering module 52 may include a rotary-steerable system that facilitates directional drilling of the well 14. The communication module 54 can enable communication of data (e.g., data collected by the LWD module 44 and the MWD module 46) between the bottomhole assembly 18 and the surface. In one embodiment, the communication module 54 can communicate via mud pulse telemetry, in which the communication module 54 uses the drilling fluid 32 in the drill string 16 as a propagation medium for a pressure wave encoding the data to be transmitted.

The drilling system 10 can also include a monitoring and control system 56. The monitoring and control system 56 can include one or more computer systems that enable monitoring and control of various components of the drilling system 10. The monitoring and control system 56 can also receive data from the bottomhole assembly 18 (e.g., data from the LWD module 44, the MWD module 46, and the additional module 48) for processing and for communication to an operator, to name just two examples. While depicted on the drill floor 30 in FIG. 1, it is noted that the monitoring and control system 56 could be positioned elsewhere, and that the monitoring and control system 56 could be a distributed system with elements provided at different places near or remote from the well 14.

Figure 2:
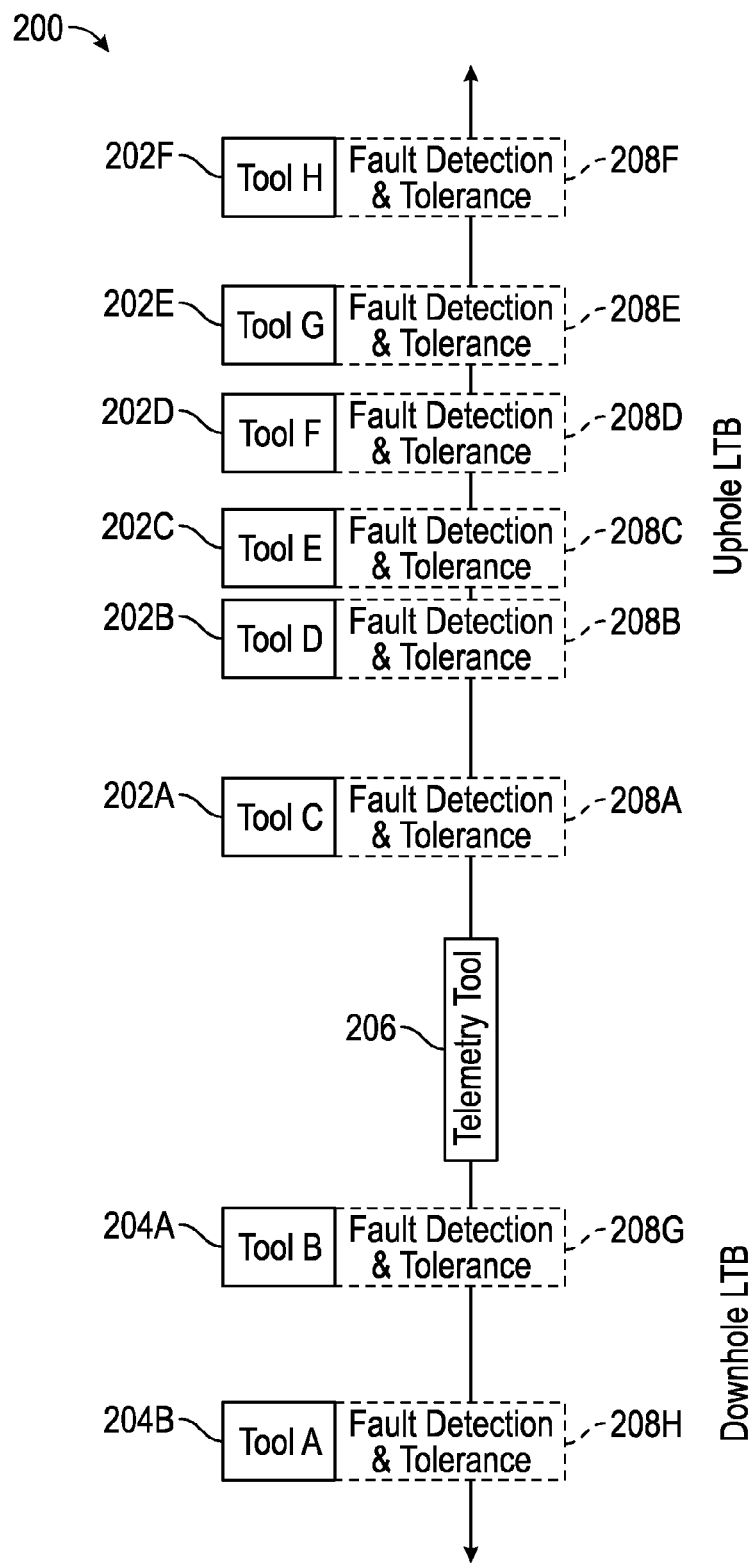
FIG. 2 is a is a schematic diagram of a tool string in accordance with an example embodiment of the disclosure.

FIG. 2 depicts a tool string 200 having tools 202 and 204 and a telemetry tool 206 in accordance with an embodiment of the present disclosure. The tools 202 and 204, and the telemetry tool 206, may be disposed along the tool string 200 and may be connected in series by one or more electrical conductors, so that each tool 202 and 204 is thus connected in series from the telemetry tool 206. In some embodiments, the tools 202 and 204 may be connected in series by a single electrical conductor using chassis or collar of the tool string 200 as a return path. In some embodiments, the electrical path (also referred to as a "serial path") may be known as a Lower Power Tool Bus ("LTB"). The tools 202 and 204 may include different types of tools that perform various functions during drilling and measurement.

As shown in FIG. 2, the tools 202 may be disposed "above" (also referred to as upstream or uphole) from the telemetry tool 206. Similarly, as shown in FIG. 2, the tools 204 may be disposed "below" (also referred to as downstream or downhole) from the telemetry tool 206. However, it should be appreciated that the directions "above" and "below" are used for reference and the embodiments described herein are not restricted to a particular orientation. The telemetry tool 206 may transmit power, communication, or both to the tools 202. In some embodiments, the telemetry tool 206 may be a power-source/telemetry-model tool that distributes separate uphole and downhole communication and LTB power to the tools 202 and 204 of the tool string 200. In some embodiments, the tool string 200 may include two or more telemetry tools or other sources of power, communication, or both. In some embodiments, some of the tools 202 and 204 may communicate with each other (referred to as "intertool communication"). In some embodiments, power and communication may be transmitted over the same conductor or power and communication may each be transmitted over separate conductors (e.g., a first conductor for power and a second conductor for communication, a first group of conductors for power or a second group of conductors for communication, or any combinations thereof). The telemetry tool 206 may transmit signals to tools 202 above the telemetry tool 206 and to tools 202 below the telemetry tool 206. In some embodiments, the tools 202 above the telemetry tool 206 may be referred to as upstream LTB and the tools 204 below the telemetry tool 206 may be referred to as downstream LTB.

Each of the tools 202 and 204 may be coupled to respective fault detection and tolerance circuits 208, embodiments of which are described further below. For example, a first tool 202A may be coupled to fault detection and tolerance circuit 208A, a second tool 202B may be coupled to fault detection and tolerance circuit 208B, and so on. In some embodiments, the fault detection and tolerance circuits 208 may enable operation of tools in the tool string 200 after occurrence of a fault (e.g., a short circuit also referred to as a "short") in one of the tools 202 or 204 or in the tool string 200 (e.g., in the electrical path such as the LTB). For example, a short may occur inside of a tool's electronics (e.g., on an electrical board, at the electronics input, at the electronics output, etc.) or between two tool's chassis (e.g., such as at an LTB extender connection).

Accordingly, the fault detection and tolerance circuits 208 may enable the tool string 200 to continue drilling and measurement operations after the occurrence of a short circuit fault by electrically isolating a tool or portion of a tool string in which a fault occurred and preventing an overcurrent condition at the telemetry tool 206. For example, in some embodiments, the fault detection and tolerance circuit 208B may detect a short in or near tool 202B such that tools below the short (e.g., tools 202A) may continue to receive signals (e.g., communication and power) from and, in some embodiments, transmit signals to, the telemetry tool 206. As mentioned above, in some embodiments, the tools below the short may also continue to transmit signals (e.g., communication) to each other. In some instances, as described below, embodiments of the fault detection and tolerance circuit 208B may also enable the transmission of communications to tools above the short (e.g., tool 202C) after a short is detected and isolated. Similarly, the fault detection and tolerance circuit 206C may detect a short in or near tool 204A such that tools above the short (e.g., tool 202A) may continue to receive signals from and, in some embodiments, transmit signals to, the telemetry tool 206. As mentioned above, in some embodiments, the tools above the short may also continue to transmit signals (e.g., communication) to each other.

Figure 3:
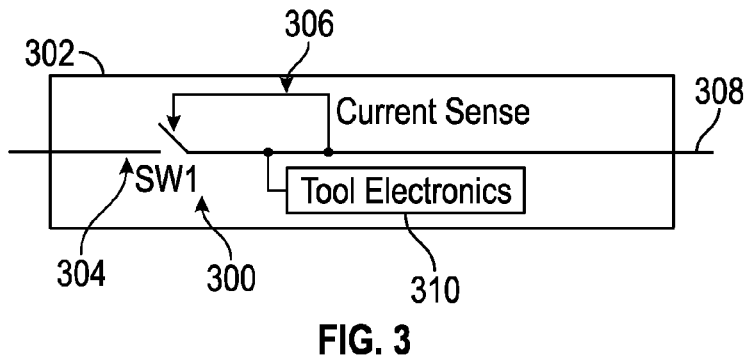
FIG. 3 is a schematic diagram of an example fault detection and tolerance circuit of a tool of a tool string in accordance with an embodiment of the disclosure.

FIG. 3 depicts an example of a fault detection and tolerance circuit 300 of a tool 302 in accordance with an embodiment of the disclosure. In some embodiments, the fault detection and tolerance circuit 300 may be integrated into the tool 302. In other embodiments, the fault detection and tolerance circuit 300 may be a separate component from the tool 302.

The fault detection and tolerance circuit 300 may include switch 304 (SW1) and a current sense circuit 306 coupled to a tool string 308 (e.g., a tool string having a one or more conductors that serve as electrical paths). FIG. 3 also illustrates the tool electronics 310 associated with a tool 302 of the tool string 306. In some embodiments, the default position of the switch 304 is open (e.g., the switch 304 is open before and during initial operation of the tool string 308). If no short is detected by the current sense circuit 306, the switch 304 may be closed to enable transmission of signals (e.g., power and communication) to the other tools of the tool string 308 in series with the tool 300. If a short is detected by the current sense circuit 306, the switch 304 remains open and prevents tools in the tool string 306 located after the tool 302 from receiving signals (e.g., communication and power) from a telemetry tool of the tool string 308. For example, if the tool 302 is located above the telemetry tool of the tool string 308, in an open position the switch 304 may prevent tools above the tool 302 from receiving signals (e.g., communication and power) from and, in some embodiments, transmitting signals to, the telemetry tool. In another example, if the tool 302 is located below the telemetry tool of the tool string 308, in an open position the switch 304 may prevent tools below the tool 302 from receiving signals (e.g., communication and power) from and, in some embodiments, transmitting signals to the telemetry tool.

In some embodiments, the fault detection and tolerance circuit 300 may implement a delay such the fault detection and tolerance circuit 300 and other circuits in series in the electrical path turn on sequentially at power up. Each fault detection and tolerance circuit may sense if there is a fault (e.g., a short) in a respective tool or in the electrical path to the next tool and, if no fault is detected, transmission of signals can be enabled along the electrical path. Moreover, the delay in the fault detection and tolerance circuit 300 reduces the inrush current to the tool. For example, a second tool in the tool string may be powered on after a delay from a time a first tool in series in the tool string is powered on. In some embodiments, the fault detection and tolerance circuit 300 may be used to selective power off tools in a tool string to conserve power. For example, an override mechanism may be provided to enable selective powering off tools in the tool string. In some embodiments, selectively power off tools may be performed to balance peak power between stationary tools of the tool string and non-stationary tools of the tool string. For example, when a tool string is stationary the non-stationary tools may be powered off, whereas when the tool string is non-stationary the stationary tools may be powered off.

Figure 4:
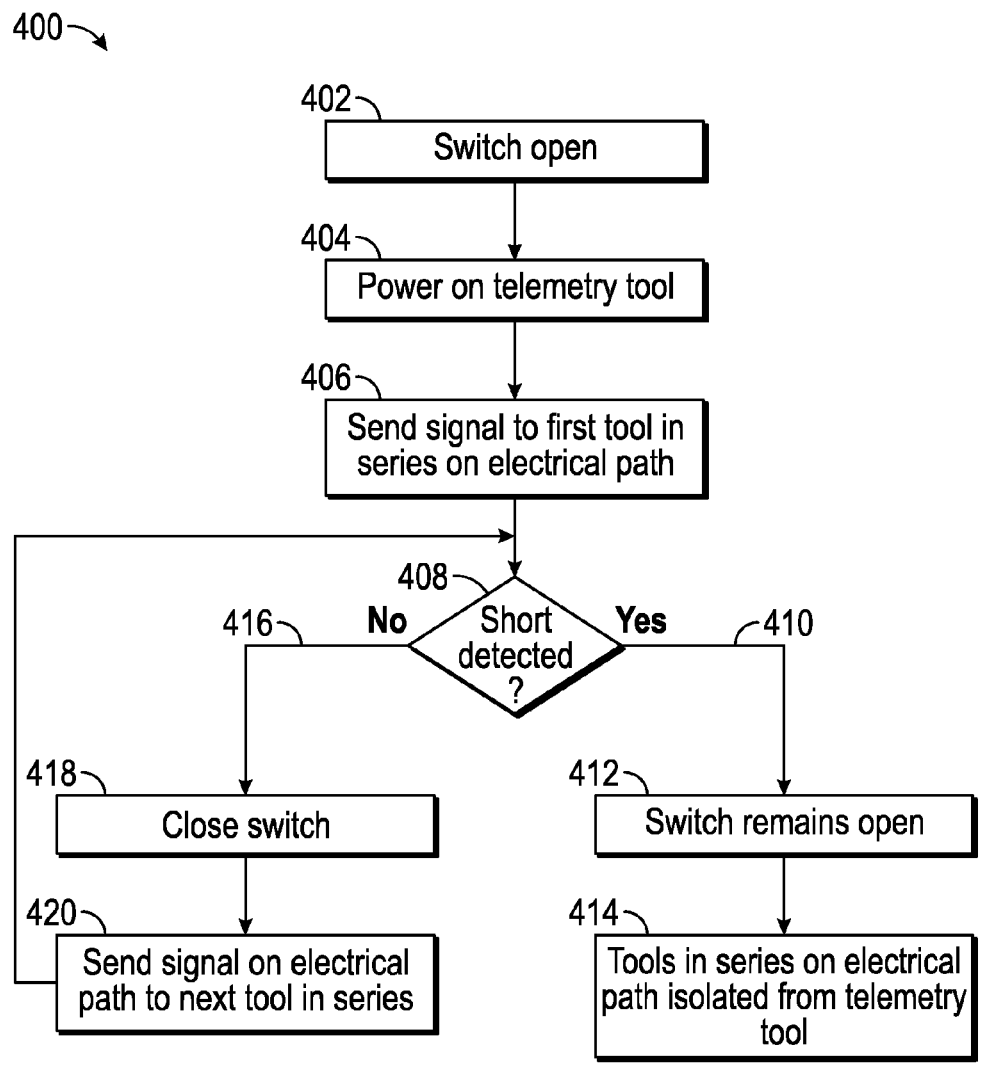
FIG. 4 is a block diagram of an example process of operation of a tool string having the fault detection and tolerance circuit of FIG. 3 in accordance with an embodiment of the disclosure.

FIG. 4 depicts a process 400 of operation of the example fault detection and tolerance circuit 300 described above in accordance with an embodiment of the disclosure. Initially, as described above, the switch SW1 of the fault detection and tolerance circuit 300 is in an open position (block 402). A telemetry tool in the tool string is powered on (block 404), and a signal (e.g., one or more signals) is sent to the first tool in series on an electrical path of the tool string (block 406). The current sense circuit may determine whether a short is detected in the tool string at the tool (decision block 408). If a short is detected (line 410), the switch remains open (block 412) and the tools in series on the electrical path of the tool string are isolated from the telemetry tool and do not receive signals from and transmit signals to the telemetry tool (block 414).

If a short is not detected, the switch is closed (block 416) and the signal from the telemetry tool is sent to the next tool in series on the electrical path of the tool string (block 418). In such instances, a corresponding fault detection and tolerance circuit in the next tool in the string may detect a short and close a corresponding switch if appropriate. In some embodiments, the fault detection and tolerance circuit may implement a delay such that tools in the tool string power on sequentially if no shorts are detected in each tool or the tool string.

Figure 5:
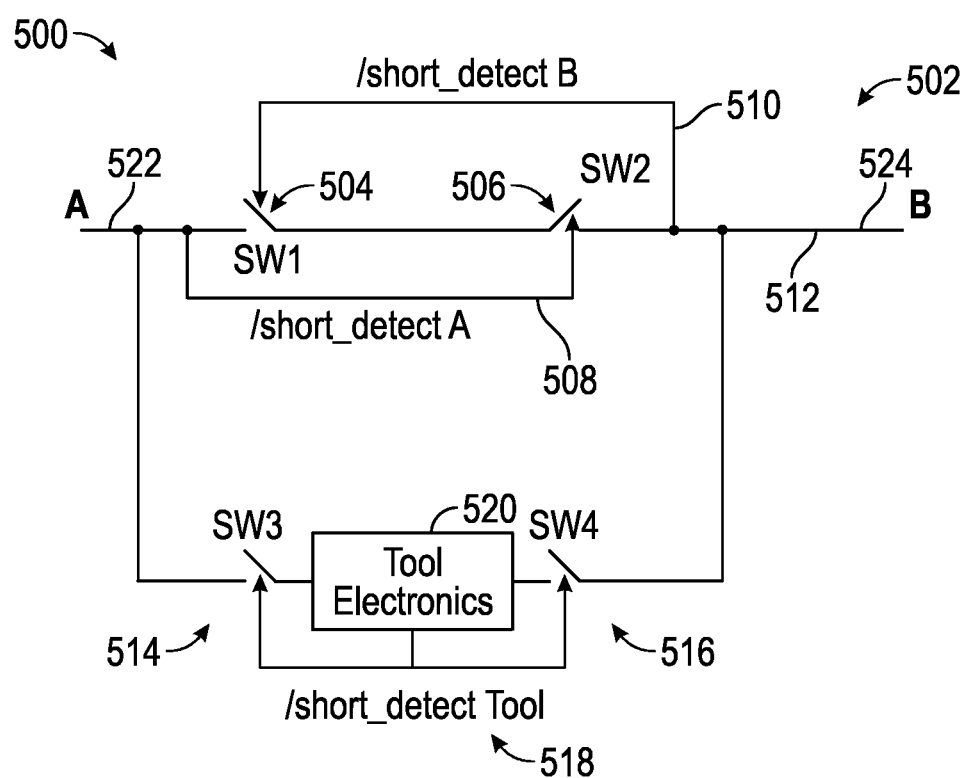
FIG. 5 is schematic diagram of an example fault detection and tolerance circuit of a tool of a tool string in accordance with an embodiment of the disclosure.

FIG. 5 depicts an example of a fault detection and tolerance circuit 500 of a tool 502 in accordance with another embodiment of the disclosure. In some embodiments, the fault detection and tolerance circuit 500 may be integrated into the tool 502. In other embodiments, the fault detection and tolerance circuit 500 may be a separate component from the tool 502. As described below, the fault detection and tolerance circuit 500 may be disposed either above (uphole) from a telemetry tool in a tool string or below (downhole) from a telemetry tool in the tool string.

The fault detection and tolerance circuit 500 may include a first switch 504 (SW1), a second switch 506 (SW2), a first current sensing circuit 508 (short_detect A), and a second current sensing circuit 510 (short_detect B) each coupled to a tool string 512 (e.g., a tool string having a one or more conductors that serve as electrical paths). As described further below, the first switch 504, the second switch 506, the first current sensing circuit 508, and the second current sensing circuit 510 may enable detection and isolation of a short in the tool string between two tools. As shown in FIG. 5, the fault detection and tolerance circuit 500 also includes a third switch 514, a fourth switch 516, and a third current sensing circuit 518 configured to detect shorts in the tool electronics 520 of the tool 502.

As shown in FIG. 5, the fault detection and tolerance circuit 500 may enable function of a telemetry tool of the tool string 512 either above the circuit 500 on electrical path 522 or below the circuit 500 on electrical path 524. In some embodiments, the default positions of the switches 504 and 506 may be open (e.g., the switches 504 and 506 are open before and during initial operation of the tool string 512). If the telemetry tool is located above the circuit 500 on electrical path 522 and no short is detected by the first current sensing circuit 508, the first switch 504 may be closed to enable transmission of signals (e.g., power and communication) to the other tools in series in the tool string 512. If the telemetry tool is located above the circuit 500 on electrical path 522 and a short is detected by the first current sense circuit 506, the switch 504 remains open and prevents tools in the tool string 512 located after the tool from receiving signals from and, in some embodiments, transmitting signals to, the telemetry tool (e.g., tools located along electrical path 522).

Similarly, if the telemetry tool is located below the circuit 500 on electrical path 524 and no short is detected by the second current sensing circuit 510, the second switch 506 may be closed to enable transmission of signals (e.g., power and communication) to the other tools in series in the tool string 512. If the telemetry tool is located below the circuit 500 on electrical path 524 and a short is detected by the second current sense circuit 508, the second switch 506 remains open and prevents tools in the tool string 512 located before the tool from receiving signals from and, in some embodiments, transmitting signals to, the telemetry tool (e.g., tools located along electrical path 524).

In a similar manner, the third switch 514, the fourth switch 516, and the third current sensing circuit 520 may detect and isolate shorts in the tool electronics 520. In some embodiments, the default positions of the switches 514 and 516 may be open (e.g., the switches 514 and 516 are open before and during initial operation of the tool string 512). If no short is detected by the third current sense circuit 516, the switches 512 and 512 may be closed to enable transmission of signals (e.g., power and communication) to and functioning of the tool electronics 518. If a short in the tool electronics 518 is detected by the third current sense circuit 516, the switches 514 and 516 remain open and prevent an overcurrent condition at the telemetry tool in the tool string 512. All other tools in series in the electrical path of the tool string 512 continue to receive signals (e.g., power and communication) from and, in some embodiments, transmit signals to, the telemetry tool in the tool string 512.

In some embodiments, the fault detection and tolerance circuit 500 may implement a delay such the fault detection and tolerance circuit 500 and other circuits in series in the electrical path turn on sequentially at power up. Each fault detection and tolerance circuit may sense if there is a fault (e.g., a short) in a respective tool or in the electrical path to the next tool and, if no fault is detected, transmission of signals can be enabled along the electrical path. Moreover, the delay in the fault detection and tolerance circuit 500 reduces the inrush current to the tool. For example, a second tool in the tool string may be powered on after a delay from a time a first tool in series in the tool string is powered on. In some embodiments, the fault detection and tolerance circuit 500 may be used to selective power off tools in a tool string to conserve power. For example, an override mechanism may be provided to enable selective powering off tools in the tool string.

Figure 6:
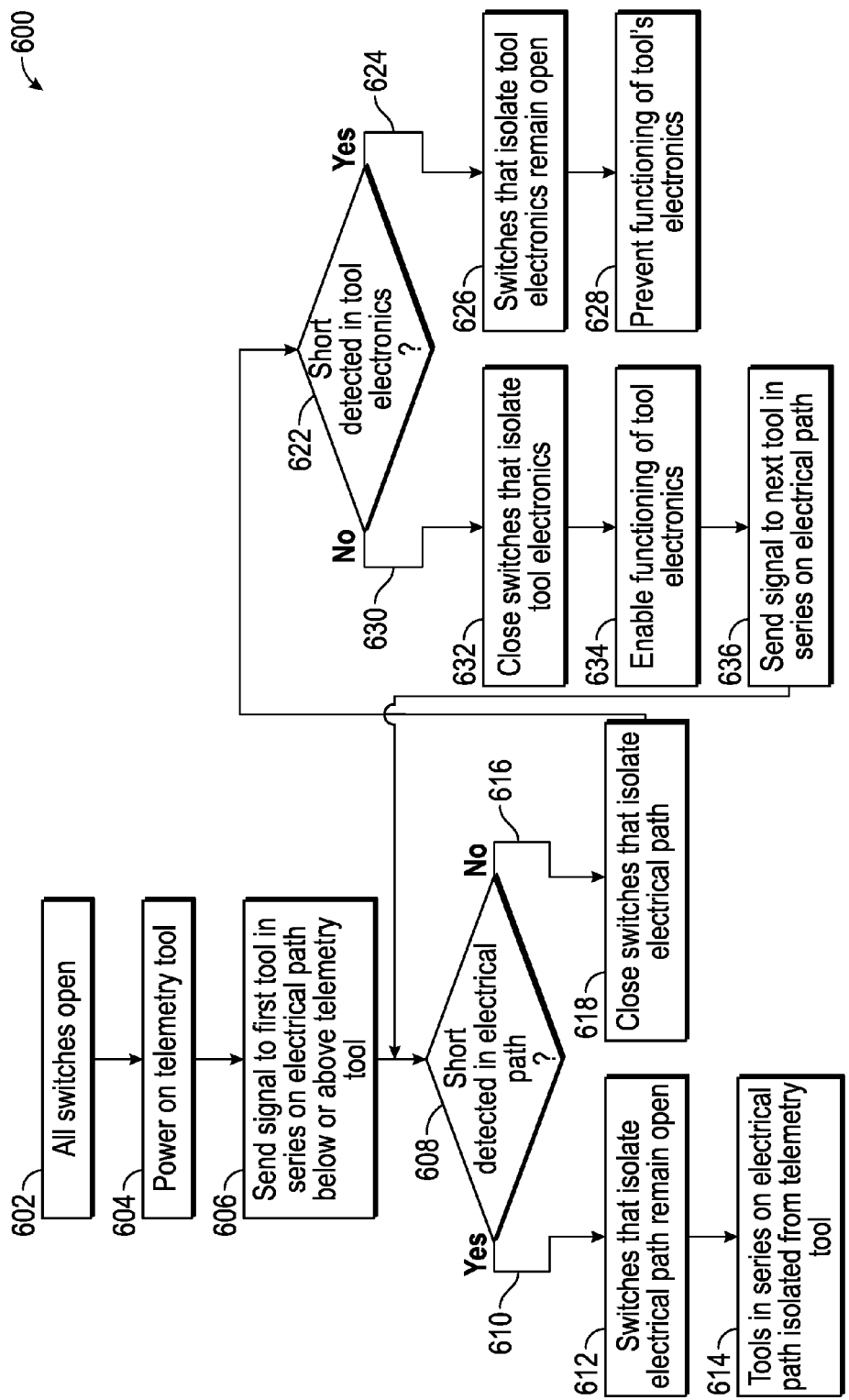
FIG. 6 is a block diagram of an example process of operation of a tool string having the fault detection and tolerance circuit of FIG. 5 in accordance with an embodiment of the disclosure.

FIG. 6 depicts an example process 600 of operation of the fault detection and tolerance circuit 600 described above and in accordance with an embodiment of the disclosure. Initially, as described above, all switches of the fault detection and tolerance circuit 600 are in an open position (block 602). A telemetry tool in the tool string is powered on (block 604), and a signal (e.g., one or more signals) is sent to the first tool in series along the electrical path above or below the telemetry tool (block 606). As described above, a current sense circuit may determine whether a short is detected in the electrical path (decision block 608). For example, as described above, the fault detection and tolerance circuit 600 may include a current sense circuit to detect a short if the telemetry tool is above the tool or below the tool. If a short is detected (line 610), one or both switches that isolate the electrical path remain open (block 612) and the tools in series on the electrical path are isolated from the telemetry tool and do not receive signals from or transmit signals to the telemetry tool (block 614). If a short is not detected by the appropriate current sense circuit (line 616), the switches that isolate the electrical path are closed (block 618)

Additionally, as described above, a third current sense circuit may determine if a short is detected in the tool electronics (block 622). If a short is detected (line 624), both switches that isolate the tool electronics remain open (block 626) to prevent functioning of the tool electronics (block 628). If a short is not detected by the third current sense circuit (line 630), the switches that isolate the tool electronics are closed (block 632) to enable functioning of the tool electronics (block 634). As described above, the signal from the telemetry tool is sent to the next tool on the electrical path (block 636).

Figure 7:
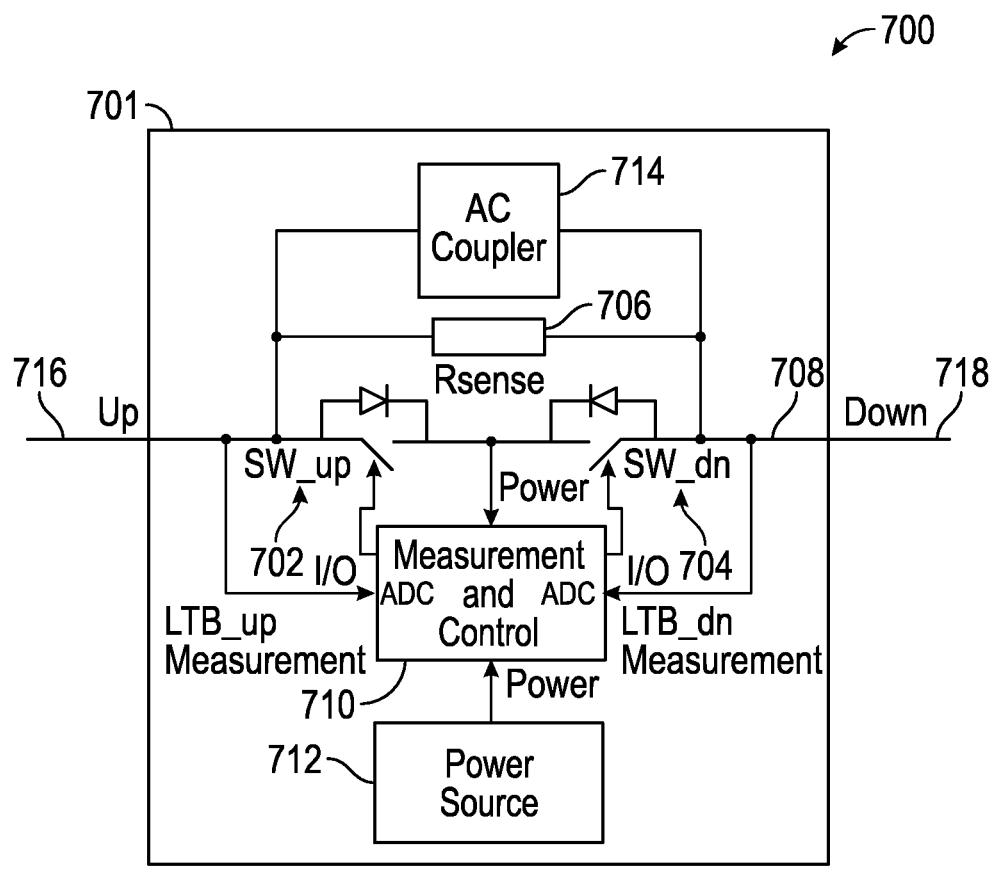
FIG. 7 is schematic diagram of an example fault detection and tolerance circuit of a tool of a tool string in accordance with an embodiment of the disclosure.

FIG. 7 depicts an example of an example fault detection and tolerance circuit 700 of a tool 701 in accordance with another embodiment of the disclosure. In some embodiments, the fault detection and tolerance circuit 700 may be integrated into the tool 701. In other embodiments, the fault detection and tolerance circuit 700 may be a separate component from the tool 701. As described below, the fault detection and tolerance circuit 700 may be disposed either above (uphole) from a telemetry tool in a tool string or below (downhole) from a telemetry tool in the tool string. Moreover, as described further below, the fault detection and tolerance circuit 700 may, in the event of a short, isolate a tool or portion of a tool string from receiving power from the telemetry tool but may still provide for the transmission of communications from the telemetry tool to other tools in series along the electrical path (or between other tools in series along the electrical path).

The fault detection and tolerance circuit 700 may include a first switch 702, a second switch 704, and a sense resistor 706 coupled to a tool string 708 (e.g., a tool string having a one or more conductors that serve as electrical paths). FIG. 7 also illustrates the tool electronics 710 associated with a tool of the tool string 708. In some embodiments, the tool may include or be coupled to a power source 712. In some embodiments, the fault detection and tolerance circuit 700 may also include an AC coupler 714.

As shown in FIG. 7, a telemetry tool of the tool string 708 may be located either above the circuit 700 on electrical path 716 or below the circuit 700 on electrical path 718. In some embodiments, the default position of the switches 702 and 704 are open (e.g., the switches 702 and 704 are open before and during initial operation of the tool string 708. As power arrives from one side of the fault detection and tolerance circuit 700, a sense signal is provided to the other side of the circuit 700 via the sense resistor 706. The next tool in series along the electrical path may draw a minimal amount of power such that input capacitors may first be charged to smooth out a rise in voltage. The voltage rise may be measured by the analog/digital converter (ADC) channels to detect for faults (e.g., shorts). If no shorts are detected, the switches 702 and 704 are closed to enable transmission of signals (e.g., power and communication) to the tool and other tools in series in the tool string 708.

If a low resistance short is detected, the switch 702 remains open and the switch 702 is closed such that both communications and power are cutoff above the detected fault, e.g., along electrical path 716. If a high resistance short is detected, the switches on either side of the short remain open. For example, switch 704 and another switch for a second fault detection and tolerance circuit below the fault detection and tolerance circuit 700 may be turned off. All other switches in the fault detection and tolerance circuits in the tool string may be closed, such that power is cutoff above the short but communications may continue to be transmitted via, for example, the AC coupler 714. If a short is detected in the tool electronics, the switches 702 and 704 may remain off, such that power is cutoff above the short but communications may continue to be transmitted via, for example, the AC coupler 714.

In some embodiments, tools in the tool string 708 may include an internal power source (e.g., power source 712 of tool 701). In such instances, a tool may use their own power source instead of power received from a telemetry tool. Moreover, in some embodiments, if a portion of at tool string is cutoff from power transmissions by a fault detection and tolerance circuit, an internal power source of a tool may become a "master" power source for tools located above in the tool string. For example, in some embodiments an LTB communication master and power source may be on the downhole portion of a tool string while some or all of the loads (e.g., tools) are on the uphold portion of tool string. In such instances, the internal power source of a tool may then become a master power source for loads (e.g., tools) on the uphole portion of the tool string in the manner described above.

In some embodiments, the fault detection and tolerance circuit 700 may implement a delay such the fault detection and tolerance circuit 700 and other circuits in series in the electrical path turn on sequentially at power up. Each fault detection and tolerance circuit may sense. If there is a fault (e.g., a short) in a respective tool or in the electrical path to the next tool and, if no fault is detected, transmission of signals can be enabled along the electrical path. Moreover, the delay in the fault detection and tolerance circuit 700 reduces the inrush current to the tool. For example, a second tool in the tool string may be powered on after a delay from a time a first tool in series in the tool string is powered on. In some embodiments, the fault detection and tolerance circuit 700 may be used to selective power off tools in a tool string to conserve power. For example, an override mechanism may be provided to enable selective powering off tools in the tool string.

Figure 8A:
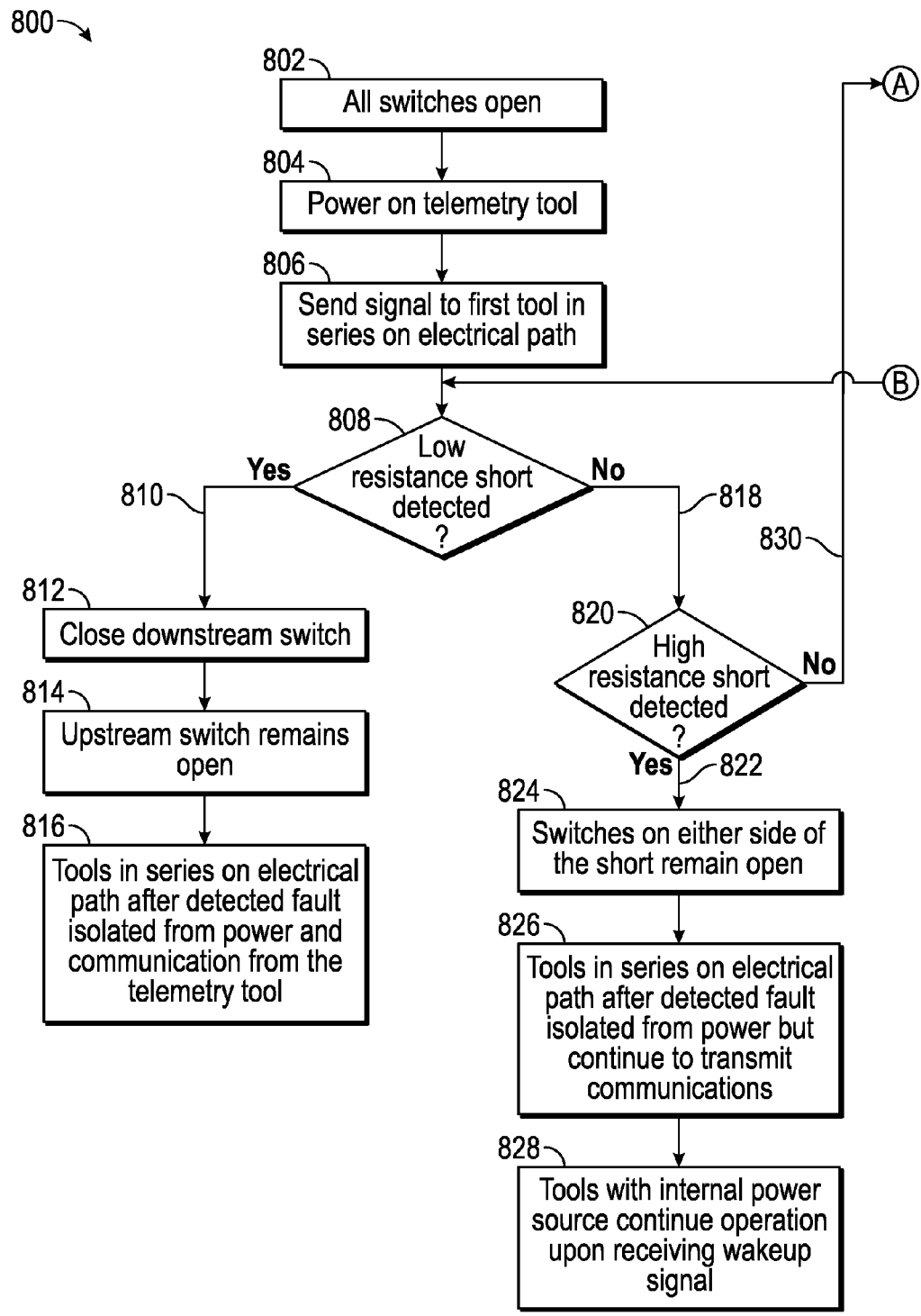
FIGS. 8A and 8B are block diagrams of an example process of operation of a tool string having the fault detection and tolerance circuit of FIG. 7 in accordance with an embodiment of the disclosure.
Figure 8B:
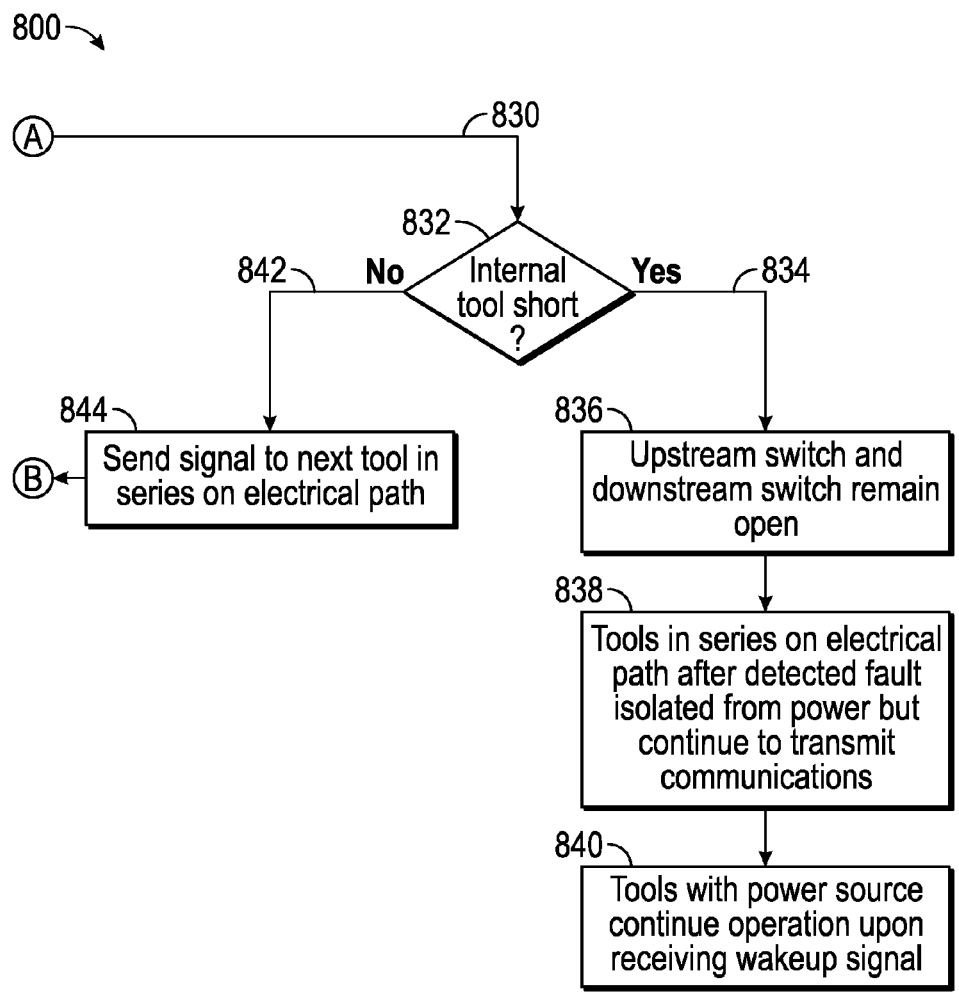

FIGS. 8A and 8B depict an example process 800 of operation of the fault detection and tolerance circuit 700 described above and in accordance with an embodiment of the disclosure. Initially, as described above, all switches of the fault detection and tolerance circuit 700 are in an open position (block 802). A telemetry tool (or, in some embodiments, another source of signals) in the tool string is powered on (block 804), and a signal (e.g., one or more signals) is sent to the first tool in the electrical path (block 806). As described above, a current sense circuit may determine whether a low resistance short is detected in the tool string near the tool (decision block 808). For example, as described above, the fault detection and tolerance circuit 700 may include a current sense circuit to detect a low resistance short. If a low resistance short is detected (line 810), the downstream switch is closed (block 812) and the upstream switch remains open (814), such that tools in series on the electrical path after the detected fault are isolated from power and communications transmitted from the telemetry tool (block 816) and, in some embodiments, are unable to transmit communication to the telemetry tool.

If a low resistance short is not detected (line 818), a current sense circuit may determine whether a high resistance short is detected (decision block 820). If a high resistance short is detected (line 822), switches on either side of the short may remain open (824), such tools in series on the electrical path after the detected fault are isolated from power but continue to transmit communications (block 826) (e.g., transmit communications to the telemetry tool and/or to other tools in the tool string and, in some embodiments, receive communications from the telemetry tool). In some embodiments, tools in series on the electrical path after the detected fault that have an internal power source may continue operation upon receiving a wakeup signal (block 828).

As shown by connector block A, the process 800 is further illustrated in FIG. 8B. As shown in FIGS. 8A and 8B, if a high resistance short is not detected (line 830), a current sense circuit may determine whether an internal short in the tool electronics is detected (decision block 832). If the internal short is detected (line 834), both the upstream switch and the downstream switch may remain open (block 836), tools in series on the electrical path after the detected fault are isolated from power but continue transmit communications (block 838) (e.g., transmit communications to the telemetry tool and/or to other tools in the tool string and, in some embodiments, receive communications from the telemetry tool). In some embodiments, tools in series on the electrical path after the detected fault that have an internal power source may continue operation upon receiving a wakeup signal (block 840). If no internal short is detected (line 842), then the upstream switch and the downstream switch are closed and the signal from the telemetry tool is sent to the next tool in series on the electrical path of the tool string (844). As shown by connector block B, the process 800 may continue and detect shorts in the next portion and tool of the tool string.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way used for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense and not for purposes of limitation.

What is claimed is:

1. A method, comprising:
providing a first signal and a second signal from a signal source to a first tool of a plurality of tools in a tool string, the plurality of tools configured to obtain measurements in a wellbore of a well, wherein the signal source is located downhole from the first tool, and the first signal comprises power, and the second signal comprises a communication to at least one of the tools of the plurality of tools;
determining whether a fault having a resistance exists in an electrical path between the first tool and a second tool of the plurality of tools; and
maintaining an uphole switch in an open position and switching a downhole switch to a closed position if the fault exists and the resistance comprises a first resistance; and
maintaining the uphole switch in an open position and maintaining the downhole switch in an open position if the fault exists and the resistance comprises a second resistance higher than the first resistance.

2. The method of claim 1, wherein maintaining an uphole switch in an open position and a downhole switch in a closed position prevents the first signal and the second signal from transmitting to the second tool.

3. The method of claim 1, wherein maintaining the uphole switch in an open position and the downhole switch in an open position prevents the first signal from transmitting to the second tool and enables the second signal to transmit to the second tool.

4. The method of claim 3, wherein the second tool comprises an internal power source, wherein the internal power source is configured to provide power to the second tool when the first signal is prevented from transmitting to the second tool.

5. The method of claim 1, wherein the fault is a first fault, the method comprising determining whether a second fault exists in an electrical component of the first tool.

6. The method of claim 5, further comprising maintaining the uphole switch in an open position and the downhole switch in an open position if the second fault exists, wherein maintaining the uphole switch in an open position and the downhole switch in an open position prevents the first signal from transmitting to the second tool and enables the second signal to transmit to the second tool.

7. The method of claim 1, wherein determining whether a fault having a resistance exists in an electrical path between the first tool and a second tool of the plurality of tools comprises measuring the resistance in the electrical path using a sense resistor, wherein the sense resistor is coupled to a first portion of the electrical path on a first side of the uphole switch and on a second portion of the electrical path on a second side of the downhole switch.

8. The method of claim 1, wherein the first signal is transmitted using direct current and the second signal is transmitted using alternating current.

* * * * *